US012411783B1

(12) United States Patent
Vallius

(10) Patent No.: US 12,411,783 B1
(45) Date of Patent: Sep. 9, 2025

(54) TECHNIQUES FOR AUTOMATED SERIAL DEVICE INTEGRATION TO MICROCONTROLLER

(71) Applicant: Oura Health Oy, Oulu (FI)

(72) Inventor: Tero Juhani Vallius, Kontio (FI)

(73) Assignee: Oura Health Oy, Oulu (FI)

( * ) Notice: Subject to any disclaimer, the term of this patent is extended or adjusted under 35 U.S.C. 154(b) by 0 days.

(21) Appl. No.: 18/591,988

(22) Filed: Feb. 29, 2024

(51) Int. Cl.
G06F 1/16 (2006.01)
G06F 1/3234 (2019.01)
G06F 13/24 (2006.01)

(52) U.S. Cl.
CPC .................. G06F 13/24 (2013.01)

(58) Field of Classification Search
None
See application file for complete search history.

(56) References Cited

U.S. PATENT DOCUMENTS

| 6,219,625 | B1* | 4/2001 | Singh | G01G 19/44 235/105 |
| 9,971,313 | B2* | 5/2018 | Chung | G06F 1/163 |
| 12,287,975 | B2* | 4/2025 | Lin | G06F 3/0625 |
| 2015/0374267 | A1* | 12/2015 | Laughlin | A61B 5/1118 702/19 |
| 2016/0091955 | A1 | 3/2016 | Black et al. | |
| 2019/0254589 | A1* | 8/2019 | Russell | A61B 5/681 |
| 2019/0281127 | A1* | 9/2019 | Schmidt | H04L 67/51 |
| 2021/0116960 | A1* | 4/2021 | Wang | G02B 27/017 |
| 2022/0007185 | A1* | 1/2022 | Seo | G06F 1/3206 |
| 2022/0211322 | A1* | 7/2022 | Gunderson | A61B 5/4815 |
| 2023/0185381 | A1* | 6/2023 | Cho | G06F 1/16 345/156 |
| 2023/0337981 | A1* | 10/2023 | Srinivasan | G06F 1/3215 |
| 2024/0168567 | A1* | 5/2024 | Barachant | G06F 1/163 |

OTHER PUBLICATIONS

Lynch et al., "A Summary Review of Wireless Sensors and Sensor Networks for Structural Health Monitoring", 2006 (Year: 2006).*
"Extending Battery Life in Medical Wearable Devices", Jan. 26, 2022 (Year: 2022).*
European Patent Office, "Extended Search Report," issued in connection with European Patent Application No. 25161068.9 dated Jul. 30, 2025 (11 pages).

* cited by examiner

Primary Examiner — Hyun Nam
(74) Attorney, Agent, or Firm — Holland & Hart LLP

(57) ABSTRACT

Methods, systems, and devices for automated serial device integration to a microcontroller unit (MCU) of a wearable device are described. Hardware (HW) components of the MCU of the wearable device may receive an interrupt command from sensors of the wearable device via one or more buses during a time interval that processing components of the MCU are in an inactive state. The HW components may perform a read operation to read data from a preconfigured buffer address of the sensors during the time interval that the one or more processing components are in the inactive state and based on receiving the interrupt command. The HW components may then perform a write operation to write the data to a preconfigured memory address of the memory during the time interval that the one or more processing components are in the inactive state.

20 Claims, 8 Drawing Sheets

TECHNIQUES FOR AUTOMATED SERIAL DEVICE INTEGRATION TO MICROCONTROLLER

FIELD OF TECHNOLOGY

The following relates to wearable devices and data processing, including techniques for automated serial device integration to a microcontroller.

BACKGROUND

Some wearable devices may be configured to collect data from users associated with heart rate, motion data, temperature data, photoplethysmogram (PPG) data, and the like. Wearable devices are often battery-powered for mobility purposes. To reduce how frequently wearable devices must be charged, there is a desire to reduce power consumption and improve battery life.

DETAILED DESCRIPTION

Figure 1:
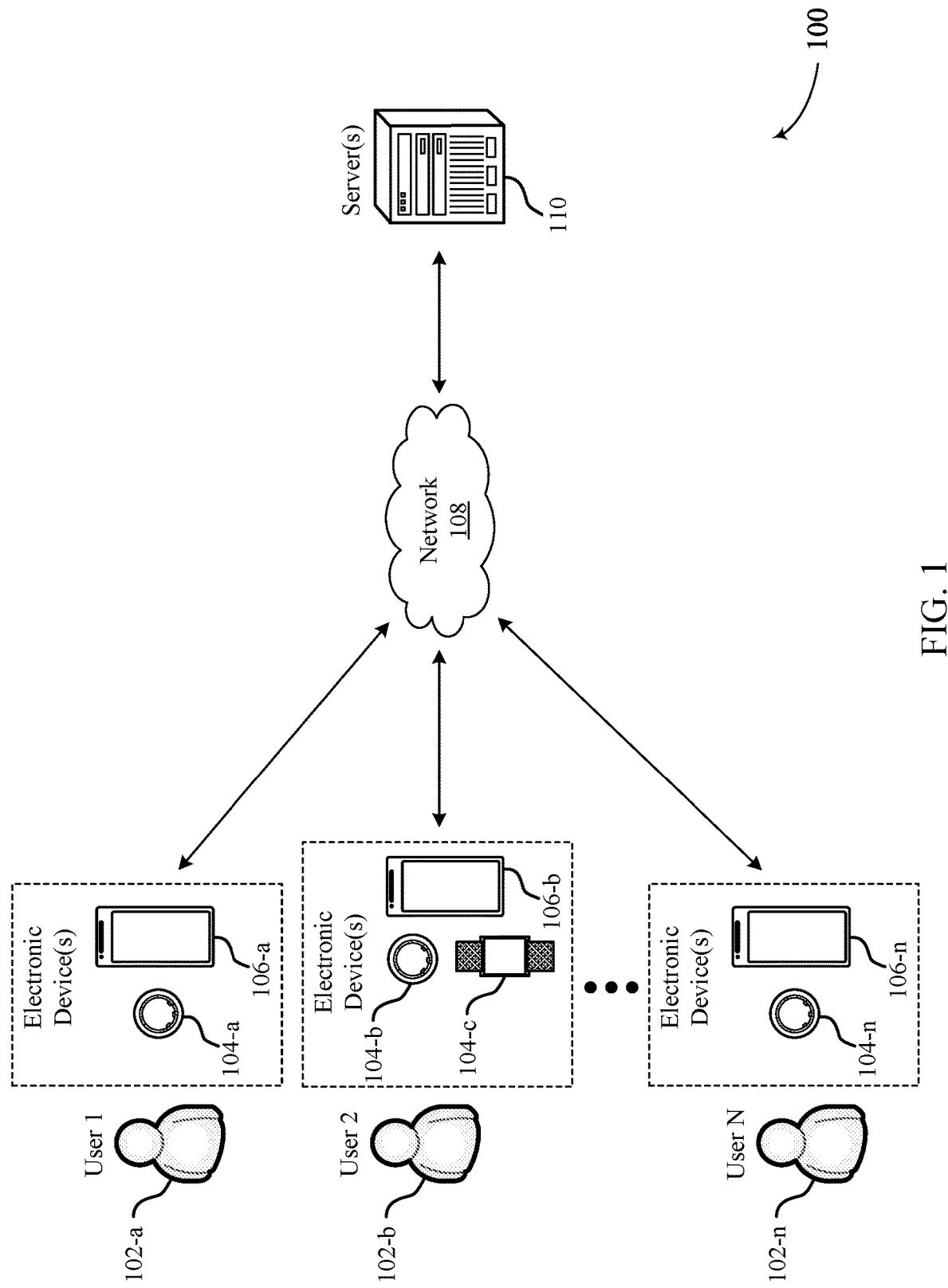
FIG. 1 illustrates an example of a system that supports techniques for automated serial device integration to a microcontroller in accordance with aspects of the present disclosure.

Wearable devices may be configured to collect physiological data from users to provide users with more information regarding their sleep patterns and overall health. To reduce how frequently wearable devices may be charged, there is a desire to reduce power consumption and improve battery life. However, current techniques for reading data from sensors of a wearable device result in high power consumption. For example, according to current techniques, a microcontroller unit (MCU) of a wearable device reads data from data buffers of sensor devices (e.g., photoplethysmogram (PPG) sensors, accelerometers, etc.) via serial busses and transfers the data to a memory (e.g., random access memory (RAM)), where the data can subsequently be processed by the MCU. In other words, the data transfer is "synchronous" in that the MCU is powered on in an active state while the data is transferred from the sensors to the memory. This synchronous data transfer results in high power consumption at the MCU. Moreover, there is often large amounts of data collected by the sensors, which increases the time it takes to transfer the data, and further increases the power consumption at the MCU when transferring such data. This issue will be compounded going forward as wearable devices include more sensors and acquire larger quantities of data.

Accordingly, techniques described herein are directed to "asynchronous" data transfer techniques where an MCU of a wearable device remains in an inactive state while data is transferred from sensors to the memory of the MCU. That is, aspects of the present disclosure are directed to data transfer techniques that enable data collected by sensors of a wearable device to be transferred to the memory without waking up the MCU core/processors. For example, when a sensor of the wearable device has data ready to be sent to the MCU, the sensor sets an interrupt that triggers a hardware (HW) sequence within the MCU to transfer the data without waking up the MCU core. In such cases, a HW block of the MCU (e.g., input/output (I/O) peripheral ports of the MCU) may read data from the data buffer of the sensors via a serial bus, and write the data to the RAM of the MCU. After the data is transferred to the RAM, the MCU core/processors may be activated to process the data. As such, the MCU core/processors may be inactive during the data transfer, thereby reducing power consumption.

There are various implementations or options for transferring data from sensors to the RAM using the HW block of the MCU (e.g., I/O peripheral ports). In accordance with a first implementation, the HW block may read a pre-configured amount of data from a pre-configured memory address of the sensor to a pre-configured location in the RAM. In accordance with a second implementation, the HW block may read a pre-configured data length register from the sensor to determine how much data is to be transferred from the sensor, then read the determined data length from the pre-configured memory address of the sensor to a pre-configured location in the RAM. In both implementations, the MCU core/processors may be inactive during the data transfer, thereby reducing power consumption and increasing the overall efficiency of the system.

Aspects of the disclosure are initially described in the context of systems supporting physiological data collection from users via wearable devices. Additional aspects of the disclosure are described in the context of a system diagram and a process flow. Aspects of the disclosure are further illustrated by and described with reference to apparatus diagrams, system diagrams, and flowcharts that relate to techniques for automated serial device integration to a microcontroller.

FIG. 1 illustrates an example of a system 100 that supports techniques for automated serial device integration to a microcontroller in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, blood oxygen saturation (SpO2), blood sugar levels (e.g., glucose metrics), and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-*a* (User 1) may operate, or may be associated with, a wearable device 104-*a* (e.g., ring 104-*a*) and a user device 106-*a* that may operate as described herein. In this example, the user device 106-*a* associated with user 102-*a* may process/store physiological parameters measured by the ring 104-*a*. Comparatively, a second user 102-*b* (User 2) may be associated with a ring 104-*b*, a watch wearable device 104-*c* (e.g., watch 104-*c*), and a user device 106-*b*, where the user device 106-*b* associated with user 102-*b* may process/store physiological parameters measured by the ring 104-*b* and/or the watch 104-*c*. Moreover, an nth user 102-*n* (User N) may be associated with an arrangement of electronic devices described herein (e.g., ring 104-*n*, user device 106-*n*). In some aspects, wearable devices 104 (e.g., rings 104, watches 104) and other electronic devices may be communicatively coupled to the user devices 106 of the respective users 102 via Bluetooth, Wi-Fi, and other wireless protocols. Moreover, in some cases, the wearable device 104 and the user device 106 may be included within (or make up) the same device. For example, in some cases, the wearable device 104 may be configured to execute an application associated with the wearable device 104, and may be configured to display data via a GUI.

In some implementations, the rings 104 (e.g., wearable devices 104) of the system 100 may be configured to collect physiological data from the respective users 102 based on arterial blood flow within the user's finger. In particular, a ring 104 may utilize one or more light-emitting components, such as LEDs (e.g., red LEDs, green LEDs) that emit light on the palm-side of a user's finger to collect physiological data based on arterial blood flow within the user's finger. In general, the terms light-emitting components, light-emitting elements, and like terms, may include, but are not limited to, LEDs, micro LEDs, mini LEDs, laser diodes (LDs) (e.g., vertical cavity surface-emitting lasers (VCSELs), and the like.

In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-*a* associated with the first user 102-*a* may be communicatively coupled to the user device 106-*a*, where the user device 106-*a* is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-*a* may be associated with a wearable device 104-*a* (e.g., ring 104-*a*) and a user device 106-*a*. In this example, the ring 104-*a* may collect physiological data associated with the user 102-*a*, including temperature, heart rate, HRV, respiratory rate, and the like. In some aspects, data collected by the ring 104-*a* may be input to a machine learning classifier, where the machine learning classifier is configured to determine periods of time that the user 102-*a* is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-*a* via a GUI of the user device 106-*a*. Sleep stage classification may be used to provide feedback to a user 102-*a* regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-*a* via the wearable device 104-*a*. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g., in a hypothetical culture with 12 day "weeks," 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support techniques for automated serial device integration to a microcontroller. For example, the system 100 may include a wearable device 104 that includes an MCU that uses HW components to perform an asynchronous data transfer from sensors to RAM while the MCU processors are asleep. In this example, the wearable device 104 may acquire physiological data from a user via one or more sensors of the wearable device 104. The wearable device 104 may store the physiological data within one or more data buffers of the one or more sensors. The sensors may communicate, via one or more buses, an interrupt command from the one or more sensors to one or more HW components of an MCU of the wearable device 104. The interrupt command is communicated via the one or more buses during a time interval that one or more processing components of the MCU are in an inactive state.

In such cases, the HW components may be configured to perform a read operation to read data from a preconfigured buffer address of the one or more data buffers during the time interval that the one or more processing components are in the inactive state in response to receiving the interrupt command. The HW components may perform a write operation to write the data to a preconfigured memory address of the memory during the time interval that the one or more processing components are in the inactive state. The one or more processing components are configured to transition from the inactive state to an active state after a completion of the write operation to process the data stored in the preconfigured memory address of the memory. That is, the wearable device 104 may activate the one or more processing components of the MCU from the inactive state to an active state based on a completion of the write operation. The wearable device 104 may process the physiological data stored in the preconfigured memory address of the memory using the one or more processing components in response to activating the one or more processing components to the active state.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
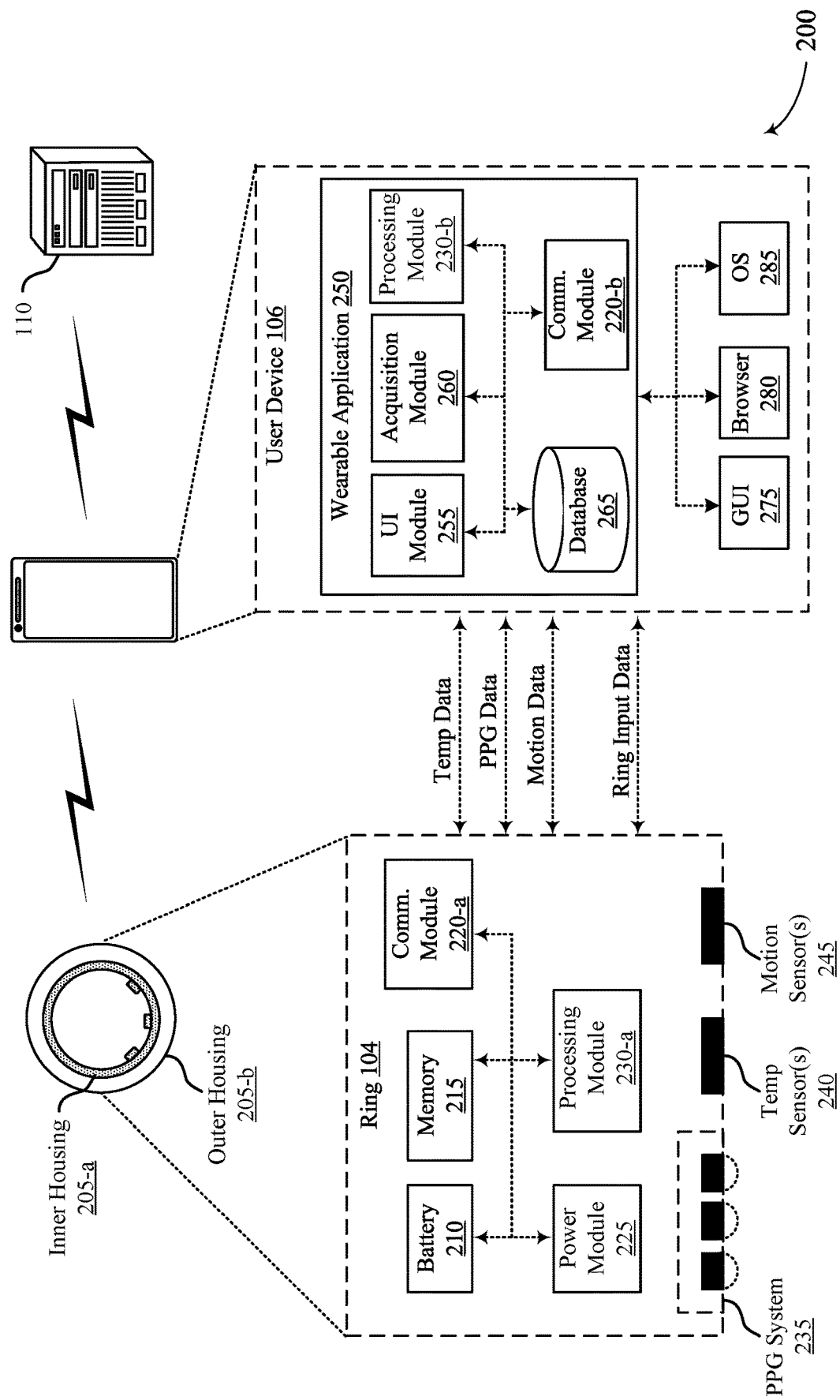
FIG. 2 illustrates an example of a system that supports techniques for automated serial device integration to a microcontroller in accordance with aspects of the present disclosure.

FIG. 2 illustrates an example of a system 200 that supports techniques for automated serial device integration to a microcontroller in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels (SpO2), blood sugar levels (e.g., glucose metrics), and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, PPG data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-a and an outer housing 205-b. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-a, a memory 215, a communication module 220-a, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using adhesives, wraps, clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-b component (e.g., a shell) and an inner housing 205-a component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-b (e.g., a metal outer housing 205-b). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-b may be fabricated from one or more materials. In some implementations, the outer housing 205-b may include a metal, such as titanium, that may provide strength and abrasion resistance at a relatively light weight. The outer housing 205-b may also be fabricated from other materials, such polymers. In some implementations, the outer housing 205-b may be protective as well as decorative.

The inner housing 205-a may be configured to interface with the user's finger. The inner housing 205-a may be formed from a polymer (e.g., a medical grade polymer) or other material. In some implementations, the inner housing 205-a may be transparent. For example, the inner housing 205-a may be transparent to light emitted by the PPG light emitting diodes (LEDs). In some implementations, the inner housing 205-a component may be molded onto the outer housing 205-b. For example, the inner housing 205-a may include a polymer that is molded (e.g., injection molded) to fit into an outer housing 205-b metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-a of the ring 104 may include one or more processors (e.g., processing units), microcontrollers, digital signal processors, systems on a chip (SOCs), and/or other processing devices. The processing module 230-a communicates with the modules included in the ring 104. For example, the processing module 230-a may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-a may communicate with the memory 215. The memory 215 may include computer-readable instructions that, when executed by the processing module 230-a, cause the processing module 230-a to perform the various functions attributed to the processing module 230-a herein. In some implementations, the processing module 230-a (e.g., a microcontroller) may include additional features associated with other modules, such as communication functionality provided by the communication module 220-a (e.g., an integrated Bluetooth Low Energy transceiver) and/or additional onboard memory 215.

The communication module 220-a may include circuits that provide wireless and/or wired communication with the user device 106 (e.g., communication module 220-b of the user device 106). In some implementations, the communication modules 220-a, 220-b may include wireless communication circuits, such as Bluetooth circuits and/or Wi-Fi circuits. In some implementations, the communication modules 220-a, 220-b can include wired communication circuits, such as Universal Serial Bus (USB) communication circuits. Using the communication module 220-a, the ring 104 and the user device 106 may be configured to communicate with each other. The processing module 230-*a* of the ring may be configured to transmit/receive data to/from the user device 106 via the communication module 220-*a*. Example data may include, but is not limited to, motion data, temperature data, pulse waveforms, heart rate data, HRV data, PPG data, and status updates (e.g., charging status, battery charge level, and/or ring 104 configuration settings). The processing module 230-*a* of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during charging. The power module 225 may also regulate voltage(s) of the device electronics, regulate power output to the device electronics, and monitor the state of charge of the battery 210. In some implementations, the battery 210 may include a protection circuit module (PCM) that protects the battery 210 from high current discharge, over voltage during charging, and under voltage during discharge. The power module 225 may also include electro-static discharge (ESD) protection.

The one or more temperature sensors 240 may be electrically coupled to the processing module 230-*a*. The temperature sensor 240 may be configured to generate a temperature signal (e.g., temperature data) that indicates a temperature read or sensed by the temperature sensor 240. The processing module 230-*a* may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-*a*) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-*a* may use to determine the temperature. As another example, in cases where the temperature sensor 240 includes a passive sensor, the processing module 230-*a* (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-*a* may sample the user's temperature over time. For example, the processing module 230-*a* may sample the user's temperature according to a sampling rate. An example sampling rate may include one sample per second, although the processing module 230-*a* may be configured to sample the temperature signal at other sampling rates that are higher or lower than one sample per second. In some implementations, the processing module 230-*a* may sample the user's temperature continuously throughout the day and night. Sampling at a sufficient rate (e.g., one sample per second) throughout the day may provide sufficient temperature data for analysis described herein.

The processing module 230-*a* may store the sampled temperature data in memory 215. In some implementations, the processing module 230-*a* may process the sampled temperature data. For example, the processing module 230-*a* may determine average temperature values over a period of time. In one example, the processing module 230-*a* may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-*a* near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-*a* may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-*a* may sample the sensors at different rates and average/store different values for the different sensors. In some implementations, the processing module 230-*a* may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-*a* may sample the PPG signal and determine a user's pulse waveform based on the PPG signal. The processing module 230-*a* may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-*a* may control one or both of the optical transmitters to transmit light while sampling the PPG signal generated by the optical receiver. In some implementations, the processing module 230-*a* may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-*a* may store the pulse waveform in memory 215 in some implementations. The processing module 230-*a* may process the pulse waveform as it is generated and/or from memory 215 to determine user physiological parameters described herein.

The processing module 230-*a* may determine the user's heart rate based on the pulse waveform. For example, the processing module 230-*a* may determine heart rate (e.g., in beats per minute) based on the time between peaks in the pulse waveform. The time between peaks may be referred to as an interbeat interval (IBI). The processing module 230-*a* may store the determined heart rate values and IBI values in memory 215.

The processing module 230-*a* may determine HRV over time. For example, the processing module 230-*a* may determine HRV based on the variation in the IBIs. The processing module 230-*a* may store the HRV values over time in the memory 215. Moreover, the processing module 230-*a* may determine the user's respiratory rate over time. For example, the processing module 230-*a* may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-*a* may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BM1160 inertial micro electro-mechanical system (MEMS) sensor that may measure angular rates and accelerations in three perpendicular axes.

The processing module 230-*a* may sample the motion signals at a sampling rate (e.g., 50 Hz) and determine the motion of the ring 104 based on the sampled motion signals. For example, the processing module 230-*a* may sample acceleration signals to determine acceleration of the ring 104. As another example, the processing module 230-*a* may sample a gyro signal to determine angular motion. In some implementations, the processing module 230-*a* may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-*a* may compress the data stored in memory 215. For example, the processing module 230-*a* may delete sampled data after making calculations based on the sampled data. As another example, the processing module 230-*a* may average data over longer periods of time in order to reduce the number of stored values. In a specific example, if average temperatures for a user over one minute are stored in memory 215, the processing module 230-*a* may calculate average temperatures over a five minute time period for storage, and then subsequently erase the one minute average temperature data. The processing module 230-*a* may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-*b*, a communication module 220-*b*, and a storage module (e.g., database 265) configured to store application data.

In some cases, the wearable device 104 and the user device 106 may be included within (or make up) the same device. For example, in some cases, the wearable device 104 may be configured to execute the wearable application 250, and may be configured to display data via the GUI 275.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support techniques for automated serial device integration to a microcontroller. The system 200 may include a wearable device that includes an MCU that uses HW components to perform an asynchronous data transfer from sensors to RAM while the MCU processors are asleep. For example, the wearable device may acquire physiological data from a user via one or more sensors of the wearable device and store the physiological data within one or more data buffers of the one or more sensors. The wearable device may communicate, via one or more buses, an interrupt command from the one or more sensors to one or more HW components of an MCU of the wearable device. The interrupt command may be communicated via the one or more buses during a time interval that one or more processing components of the MCU are in an inactive state.

In some cases, the wearable device may perform a read operation using the one or more HW components to read the physiological data from a preconfigured buffer address of one or more data buffers during the time interval that the one or more processing components are in the inactive state and based on the interrupt command. That is, the wearable device 104 may perform an "asynchronous" data transfer during which the processing components of the MCU remain in an inactive state while the HW components of the MCU transfer the data from the sensors to the memory. The wearable device may perform a write operation using the one or more HW components to write the physiological data to a preconfigured memory address of a memory of the wearable device during the time interval that the one or more processing components are in the inactive state. In some cases, the wearable device may activate the one or more processing components of the MCU from the inactive state to an active state based on a completion of the write operation and process the physiological data stored in the preconfigured memory address of the memory using the one or more processing components based on activating the one or more processing components to the active state.

Figure 3:
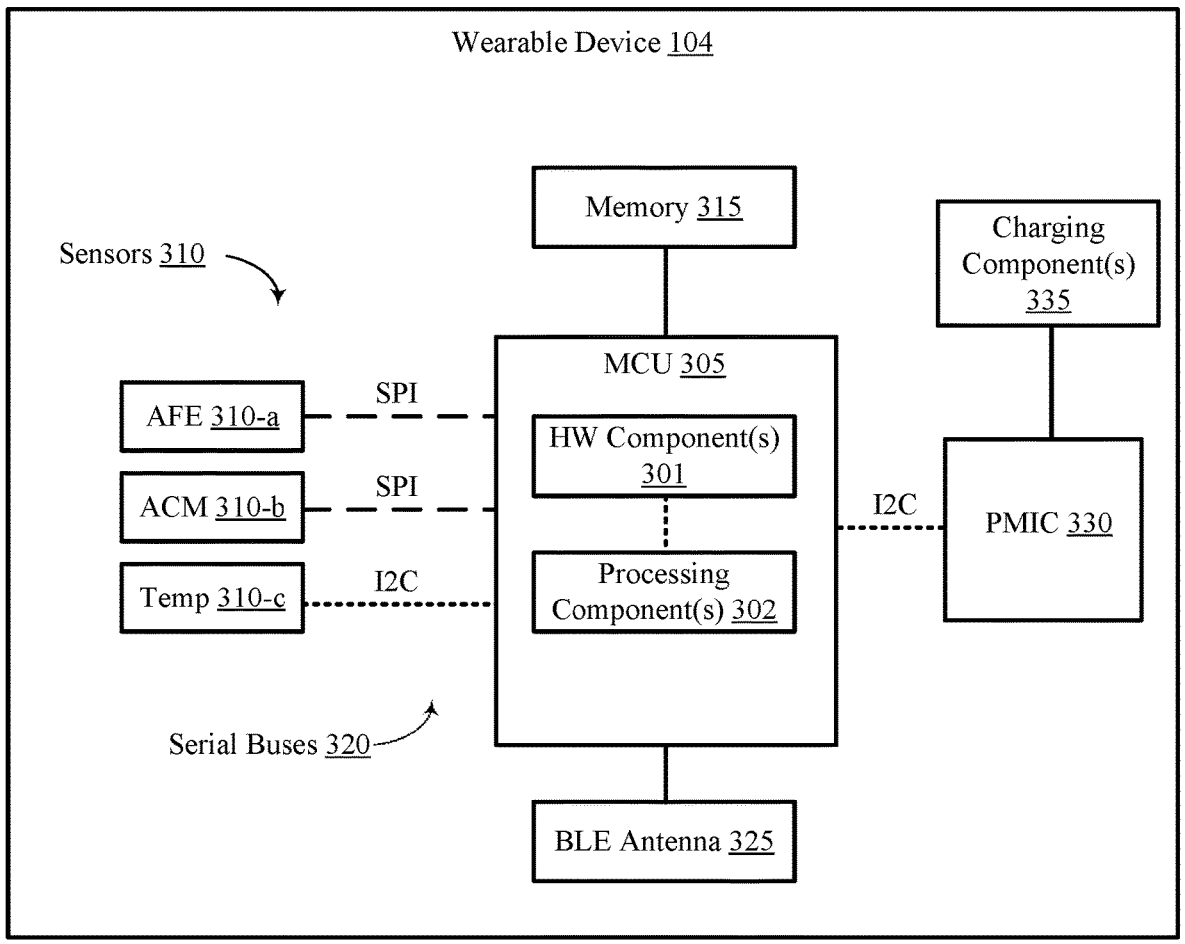
FIG. 3 shows an example of a system that supports techniques for automated serial device integration to a microcontroller in accordance with aspects of the present disclosure.

FIG. 3 shows an example of a system 300 that supports techniques for automated serial device integration to a microcontroller in accordance with aspects of the present disclosure. The system 300 may implement, or be implemented by, the system 100, the system 200, or both. In particular, the system 300 illustrates an example of a wearable device 104, as described with reference to FIG. 1. The wearable device 104 shown and described in FIG. 3 may be an example of a wearable ring device, a wrist-worn wearable device, and the like.

The wearable device 104 may acquire physiological data from a user via one or more sensors 310. The physiological data may include temperature data, heart rate data, respiratory rate data, HRV data, sleep data, blood oxygen data, among other forms of physiological data as described herein. The sensors 310 may include, but are not limited to, a PPG sensor (e.g., LEDs, PDs), a temperature sensor 310-c, a movement sensor, an electrode, or any combination thereof. For example, as shown in FIG. 3, the sensors 310 may include an analog front end (AFE) 310-a, an acceleration module (ACM) 310-b (e.g., movement/motion sensor), a temperature sensor 310-c, a finger detection electrode sensor, a pressure sensor, LEDs/PDs, a biosensor (e.g., BioZ sensor), an electrodermal activity (EDA) sensor, or a combination thereof. The sensors 310 may be coupled with the MCU 305 via one or more buses 320 (e.g., serial buses). The buses 320 may be an example of a serial peripheral interface (SPI) serial bus, an I2C serial bus, an analog-to-digital converter (ADC) serial bus, or a combination thereof.

The MCU 305 may include one or more HW components 301 and one or more processing components 302. The HW components 301 may include one or more I/O peripheral ports. For example, the HW components 301 may be coupled with the one or more sensors 310 via the buses 320. In some cases, the MCU 305 may be coupled with a Bluetooth (BLE) antenna 325, an near field communication (NFC) antenna, a power management integrated circuit (PMIC) 330, and one or more charging components 335. The one or more charging components 335 may be an example of a battery configured to power the one or more sensors, an inductive charging component, a contact-based charging component, or any combination thereof.

Techniques described herein may automate the data transfers from sensors 310 to the MCU 305 without waking up the MCU core (e.g., the processing components 302). In such cases, asynchronous data communication may occur when the MCU 305 does not wait in an awake state for the data transfer to be completed. When a sensor 310 has a buffer full of data ready, the sensor 310 may set an interrupt. For example, the sensor 310 may change a pin state by setting the interrupt line (e.g., adjusting the voltage of the interrupt line, such as a bus 320) to trigger a HW sequence inside the MCU 305. The sensor 310 may transmit an interrupt command to the MCU 305.

In a first implementation, the HW sequence (e.g., initiated by the interrupt) triggers the MCU 305 to read a preconfigured amount of data from a preconfigured memory address to a preconfigured location in the memory 315 of the MCU 305 using the serial bus 320. In a second implementation, the HW sequence triggers the MCU 305 to read a preconfigured data length register from the sensors 310 and store the data length value to a register of the MCU 305. In accordance with the second implementation, the MCU may then read the amount of data corresponding to the stored data length value from the preconfigured data register to the preconfigured location in the memory 315 of the MCU 305. In both implementations, the automatic data retrieval techniques described herein may be used to read the data to RAM (e.g., memory 315) of the MCU 305 without waking up the MCU 305. In such cases, the data may be read while the processing components 302 are inactive.

In the first implementation, the system 300 may include a fixed quantity of data to be transferred from the sensors 310 the MCU 305. For example, the AFE sensor 310-a may be configured to transmit the interrupt command to the MCU 305 such that the MCU 305 may automatically read the data from a predefined register address for predefined length of data. In such cases, the system 300 may pull predefined amounts of data from predefined registers and save the data to a predefined location. In the second implementation, the system 300 may read how much data there is to be transferred and then read the data into the MCU 305. In such cases, the system 300 may determine the quantity of data to be pulled and then pull the data from predefined registers and save the data to the predefined location.

After the data has been retrieved/written to the memory 315 of the MCU 305, the system may either send an additional interrupt command to wake up the processing components 302 of the MCU 305 to process the data or shift the receiving data address in the memory 315 of the MCU 305 to collect additional data until a preconfigured amount of data has been collected. In such cases, the processing component(s) 302 may be woken up with additional interrupt command after shifting the receiving data address in the memory 315 of the MCU 305 to collect additional data until a preconfigured amount of data has been collected. Performing an asynchronous data transfer may minimize the power consumption reading data from sensors 310. Moreover, techniques described herein may save power as the processing components 302 are not awake (e.g., remain in deep sleep mode) when the data transfer occurs.

Attendant advantages of the present disclosure are further shown and described with reference to FIG. 4.

Figure 4:
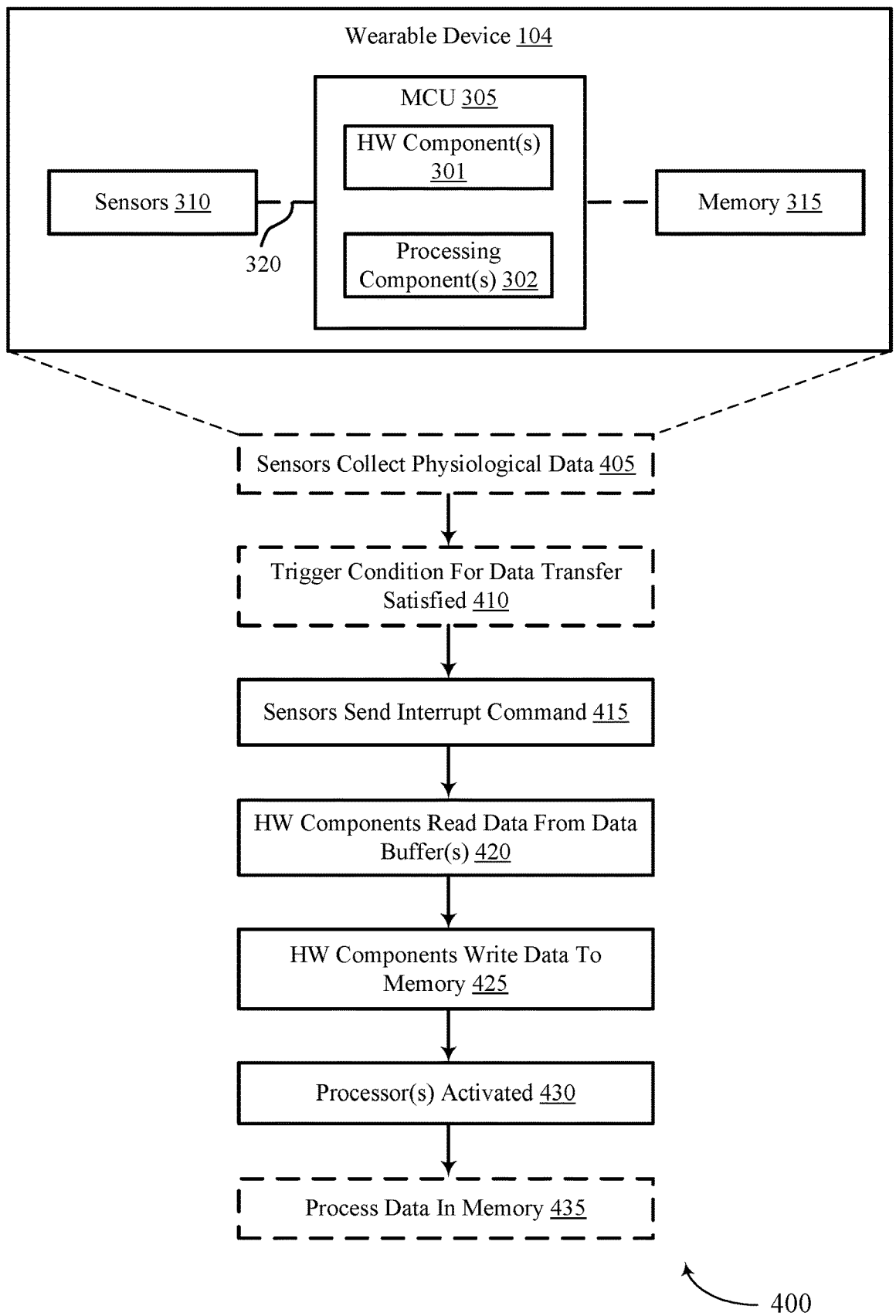
FIG. 4 shows an example of a process flow that supports techniques for automated serial device integration to a microcontroller in accordance with aspects of the present disclosure.

FIG. 4 shows an example of a process flow 400 that supports techniques for automated serial device integration to a microcontroller in accordance with aspects of the present disclosure. Aspects of the process flow 400 may implement, or be implemented by, aspects of the system 100, the system 200, the system 300, or any combination thereof. For example, the process flow 400 may include a wearable device 104 which may include the sensors 310, the MCU 305, the memory 315, the HW components 301 and the processing components 302, which may be respective examples of the components as described in reference to FIGS. 1 through 3. Alternative examples of the following may be implemented, where some steps are performed in a different order or not at all. Some steps may additionally include additional features not mentioned below. The process flow 400 illustrates techniques of performing an asynchronous data transfer from the sensors 310 to the RAM (e.g., memory 315) while the processing components 302 of the MCU 305 are asleep.

Aspects of the process flow 400 may be implemented by the wearable device 104 among other components. Additionally, or alternatively, aspects of the process flow 400 may be implemented as instructions stored in memory (e.g., firmware stored in a memory coupled with the wearable device 104). For example, the instructions, if executed by the wearable device 104, may cause the wearable device 104 to perform the operations of the process flow 400.

At 405, one or more sensors 310 may collect physiological data. For example, the one or more sensors 310 may be configured to acquire physiological data from the user. The one or more sensors 310 may include one or more data buffers for storing physiological data collected by the one or more sensors 310. In some cases, the sensors 310 may acquire physiological data from the user and store the physiological data within one or more data buffers of the one or more sensors 310.

At 410, the sensors 310 may determine that one or more trigger conditions for data transfer may be satisfied. In other words, the sensors 310 may identify a trigger condition for transferring data stored in the data buffer(s) of the sensors 310 to the memory 315 of the MCU 305/wearable device 104 for processing. For example, the one or more sensors 310 may identify that an amount of data stored in the one or more data buffers satisfies one or more trigger conditions and generate (e.g., transmit) the interrupt command for the one or more HW components 301 based on the satisfaction of the one or more trigger conditions.

In such cases, the sensors 310 may be configured with different trigger conditions that are used to trigger data transfer. The one or more trigger conditions may be based on a type of the one or more sensors, a type of physiological data stored in the one or more data buffers, an operational state of the wearable device 104, or any combination thereof.

For example, in some cases, the one or more trigger conditions are satisfied based on the amount of data being greater than or equal to a predefined data amount. That is, the one or more sensors 310 generate the interrupt command based on a preconfigured amount of data being stored in the buffer. In some examples, the one or more trigger conditions are based on a type of the one or more sensors 310, a type of physiological data stored in the one or more data buffers, an operational state of the wearable device 104, or any combination thereof. That is, the one or more sensors 310 may generate the interrupt command to trigger data transfer based on a type of sensor, a type of data to be transferred, an operational state of the wearable (e.g., "live HR data"), and the like. For example, a PPG sensor may be configured to transfer X quantity of data to the memory 315 (e.g., at a first periodicity), where a movement/motion sensor may be configured to transfer Y quantity of data to the memory 315 (e.g., at a second periodicity).

By way of another example, the trigger condition(s) for data transfer may be based on an operational state of the wearable device. For instance, in cases where the wearable device 104 is in a "live measurement" operational state (e.g., operational state for performing "live" measurements in real time or near-real time), the trigger conditions for data transfer may be adjusted so that data may be transferred from the sensors 310 to the memory 315 for processing at an increased periodicity.

At 415, the one or more sensors 310 may send an interrupt command. The interrupt command may be sent to one or more HW components 301 of the MCU 305 of the wearable device 104 via one or more buses 320. For example, the wearable device 104 may communicate, via the one or more buses 320, the interrupt command from the one or more sensors 310 to one or more HW components 301 of the MCU 305 of the wearable device 104. The interrupt command may be communicated via the one or more buses 320 during a time interval that one or more processing components 302 of the MCU 305 are in an inactive state (e.g., asleep state). In such cases, the one or more HW components 301 may receive the interrupt command from the one or more sensors 310 via the one or more buses during a time interval that the one or more processing components 302 are in an inactive state.

In some aspects, the one or more sensors 310 may transmit the interrupt command based on the satisfaction of the one or more trigger conditions at 410. For example, in some cases, the interrupt command may be generated based on a preconfigured amount of data being stored in the one or more data buffers of the one or more sensors 310 (where the preconfigured amount of data satisfies a trigger condition).

At 420, the HW components 301 may read data from one or more data buffers. For example, the HW components 301 may perform a read operation to read the physiological data from a preconfigured buffer address of one or more data buffers during the time interval that the one or more processing components 302 are in the inactive state. The HW components 301 may perform the read operation in response to receiving the interrupt command at 415.

In accordance with a first implementation, the one or more HW components 301 may be configured to perform the read operation to read a preconfigured amount of data. In such cases, the HW components 301 read a preconfigured amount of data each time an interrupt command is received.

In accordance with a second implementation, the HW components 301 may perform an additional read operation to read a data length value from an additional preconfigured buffer address of the one or more data buffers based on (e.g., in response to) receiving the interrupt command. In such cases, the read operation is performed to read an amount of data corresponding to the data length value from the preconfigured buffer address based on the additional read operation. For example, the HW components 301 may read a data length register to determine how much data to read. In such cases, the HW components 301 may perform an additional write operation to write the data length value to an additional preconfigured memory address of the memory 315. In such cases, the HW components 301 may write the data length register to a specific register in order to perform the subsequent read operation to read the physiological data stored in the data buffer(s) of the sensors 310.

In additional or alternative implementations, after receiving the interrupt command at 415, the HW components 301 may perform an additional read operation to read a status indication associated with the data from an additional preconfigured buffer address of the one or more data buffers of the sensors. In such cases, the HW components 301 may perform an additional write operation to write the status indication to an additional preconfigured memory address of the memory 315. For example, the status indication may provide information as to the relative quality of the data (e.g., information associated with errors within the frame of data), error conditions of the wearable device 104 that occurred while the data was collected (e.g., electrical issues such as voltage overflow during the data frame, excessively high force unable to be measured by ACM sensors, etc.). As described herein, the one or more processing components 302 may be configured to process the data based on the status indication stored in the additional preconfigured memory address. In such implementations, The HW components 301 may read status information for the data being transferred where the status can be used by the processing components 302 to process the data.

At 425, the HW components 301 may write data to the memory 315. For example, the HW components 301 may perform a write operation to write the physiological data to a preconfigured memory address of a memory 315 of the wearable device 104 during the time interval that the one or more processing components 302 are in the inactive state. The HW components 301 may write data to the memory 315 after reading data from the one or more data buffers.

To perform the write operation, the HW components 301 may perform the write operation to write a first portion of the data to the preconfigured memory address of the memory 315 during the time interval and perform the write operation to write a second portion of the data to a second preconfigured memory address of the memory 315 during the time interval. In such cases, the HW components 301 may shift the write address in the RAM in order to transfer increased amounts of data.

At 430, the one or more processing components 302 may be activated. For example, the wearable device 104 may activate the one or more processing components (e.g., processing components 302) of the MCU 305 from the inactive state to an active state based on (e.g., after) a completion of the write operation. In such cases, the one or more processing components 302 may be activated in response to completing the write operation at 425.

In some cases, the HW components 301 may transmit a second interrupt command to cause the one or more processing components 302 to transition from the inactive state to the active state based on writing a preconfigured amount of data to the preconfigured memory address, based on writing an entirety of the data stored in the one or more data buffers to the memory 315, or both. In such cases, the HW components 301 of the MCU 305 may transmit the interrupt command to wake up the processing components 302.

At 435, the wearable device 104 may process data in the memory 315. For example, the wearable device 104 may process the physiological data stored in the preconfigured memory address of the memory 315 using the one or more processing components 302 in response to activating the one or more processing components 302 to the active state. In some cases, the processing components 302 of the wearable device 104 may process the data stored in the preconfigured memory address of the memory after transitioning from the inactive state to the active state.

In some aspects, the one or more processing components 302 may transmit the processed data (and/or analyses of the processed data) to a user device 106, such as a smartphone or tablet. Additionally, or alternatively, the processing components 302 may transmit one or more signals to the one or more sensors 310 in response to processing the data. The one or more signals may include an instruction for the one or more sensors 310 to adjust one or more measurement parameters used by the one or more sensors 310 to acquire the physiological data. In other words, the processing components 302 may dynamically adjust how physiological data is acquired. Measurement parameters that may be adjusted at the sensor 310 may include, but are not limited to, wavelengths used to acquire physiological data, a measurement periodicity, a voltage/current applied to the sensors 310 to perform physiological measurements, an algorithm or model used by the sensors 310 to perform measurements, or any combination thereof. In this regard, by tailoring/adjusting the trigger conditions used to transfer data from the sensors 310 to the memory 315 for processing, techniques described herein may be used to tailor the data transfer rate/periodicity, thereby adjusting how quickly physiological data may be processed, and enabling the processing components 302 to dynamically adjust how physiological data is acquired to improve a data quality and reliability.

Figure 5:
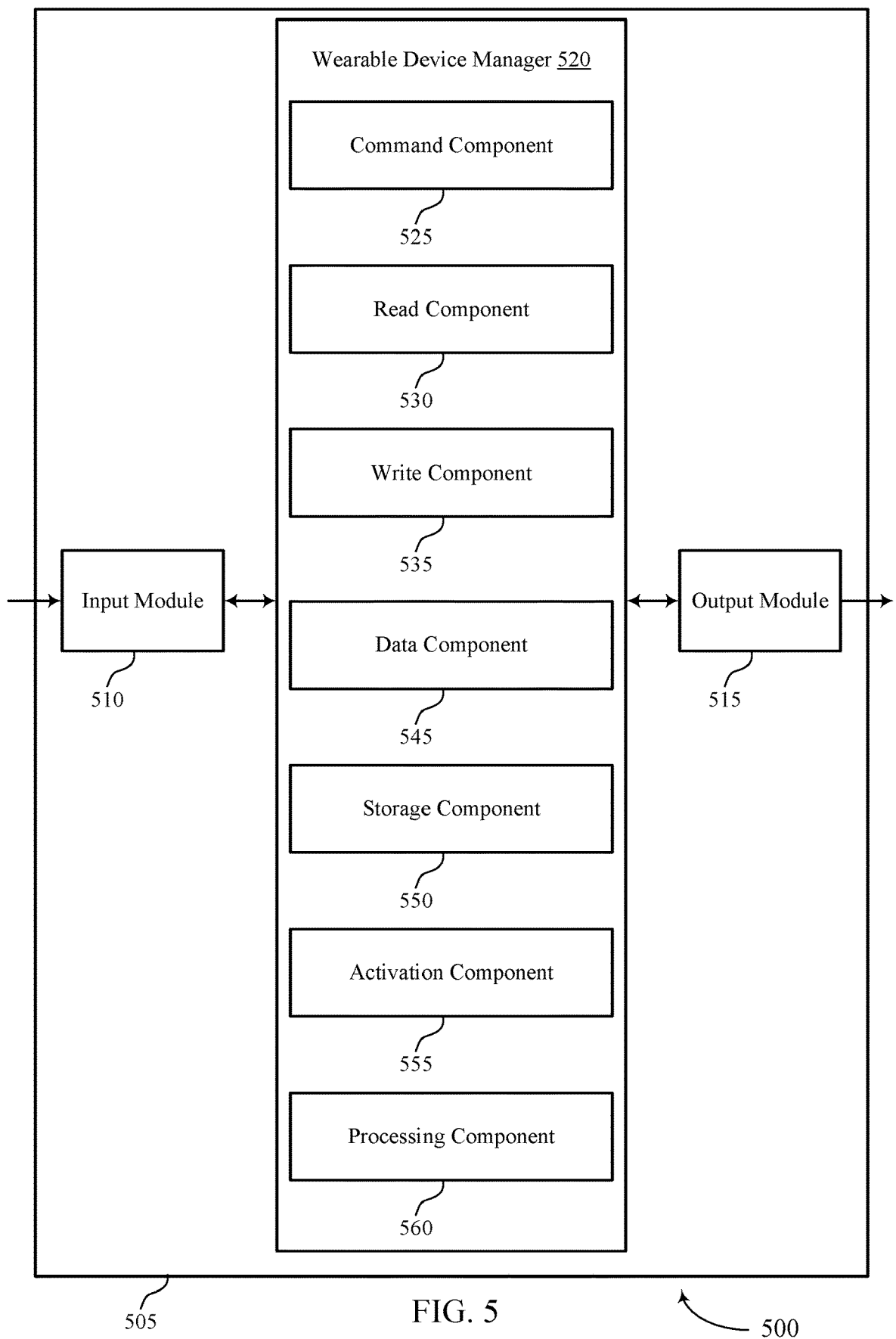
FIG. 5 shows a block diagram of an apparatus that supports techniques for automated serial device integration to a microcontroller in accordance with aspects of the present disclosure.

FIG. 5 shows a block diagram 500 of a device 505 that supports techniques for automated serial device integration to a microcontroller in accordance with aspects of the present disclosure. The device 505 may include an example of a wearable device 104 described herein. The device 505 may include an input module 510, an output module 515, and a wearable device manager 520. The device 505, or one or more components of the device 505 (e.g., the input module 510, the output module 515, the wearable device manager 520), may include at least one processor, which may be coupled with at least one memory, to support the described techniques. Each of these components may be in communication with one another (e.g., via one or more buses).

For example, the wearable device manager 520 may include a command component 525, a read component 530, a write component 535, a data component 545, a storage component 550, an activation component 555, a processing component 560, or any combination thereof. In some examples, the wearable device manager 520, or various components thereof, may be configured to perform various operations (e.g., receiving, monitoring, transmitting) using or otherwise in cooperation with the input module 510, the output module 515, or both. For example, the wearable device manager 520 may receive information from the input module 510, send information to the output module 515, or be integrated in combination with the input module 510, the output module 515, or both to receive information, transmit information, or perform various other operations as described herein.

The command component 525 may be configured as or otherwise support a means for receiving an interrupt command from the one or more sensors via the one or more buses during a time interval that the one or more processing components are in an inactive state. The read component 530 may be configured as or otherwise support a means for performing a read operation to read data from a preconfigured buffer address of the one or more data buffers during the time interval that the one or more processing components are in the inactive state and based at least in part on receiving the interrupt command. The write component 535 may be configured as or otherwise support a means for performing a write operation to write the data to a preconfigured memory address of the memory during the time interval that the one or more processing components are in the inactive state, wherein the one or more processing components are configured to transition from the inactive state to an active state after a completion of the write operation to process the data stored in the preconfigured memory address of the memory.

The data component 545 may be configured as or otherwise support a means for acquiring physiological data from a user via one or more sensors of the wearable device. The storage component 550 may be configured as or otherwise support a means for storing the physiological data within one or more data buffers of the one or more sensors. The command component 525 may be configured as or otherwise support a means for communicating, via one or more buses, an interrupt command from the one or more sensors to one or more hardware components of an MCU of the wearable device, wherein the interrupt command is communicated via the one or more buses during a time interval that one or more processing components of the MCU are in an inactive state. The read component 530 may be configured as or otherwise support a means for performing a read operation using the one or more hardware components to read the physiological data from a preconfigured buffer address of one or more data buffers during the time interval that the one or more processing components are in the inactive state and based at least in part on the interrupt command. The write component 535 may be configured as or otherwise support a means for performing a write operation using the one or more hardware components to write the physiological data to a preconfigured memory address of a memory of the wearable device during the time interval that the one or more processing components are in the inactive state. The activation component 555 may be configured as or otherwise support a means for activating the one or more processing components of the MCU from the inactive state to an active state based at least in part on a completion of the write operation. The processing component 560 may be configured as or otherwise support a means for processing the physiological data stored in the preconfigured memory address of the memory using the one or more processing components based at least in part on activating the one or more processing components to the active state.

Figure 6:
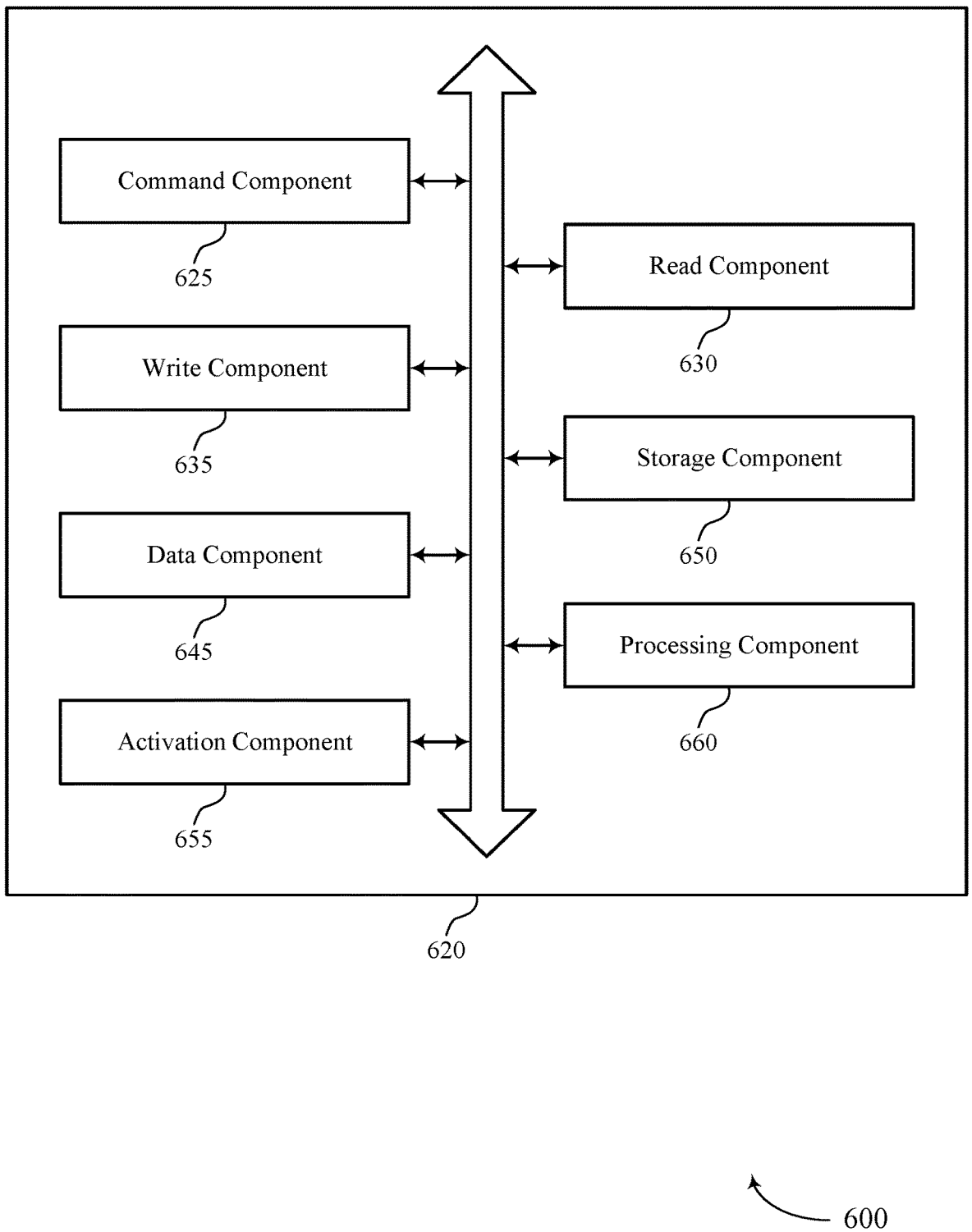
FIG. 6 shows a block diagram of a wearable device manager that supports techniques for automated serial device integration to a microcontroller in accordance with aspects of the present disclosure.

FIG. 6 shows a block diagram 600 of a wearable device manager 620 that supports techniques for automated serial device integration to a microcontroller in accordance with aspects of the present disclosure. The wearable device manager 620 may be an example of aspects of a wearable device manager or a wearable device manager 520, or both, as described herein. The wearable device manager 620, or various components thereof, may be an example of means for performing various aspects of techniques for automated serial device integration to a microcontroller as described herein. For example, the wearable device manager 620 may include a command component 625, a read component 630, a write component 635, a data component 645, a storage component 650, an activation component 655, a processing component 660, or any combination thereof. Each of these components, or components of subcomponents thereof (e.g., one or more processors, one or more memories), may communicate, directly or indirectly, with one another (e.g., via one or more buses).

The command component 625 may be configured as or otherwise support a means for receiving an interrupt command from the one or more sensors via the one or more buses during a time interval that the one or more processing components are in an inactive state. The read component 630 may be configured as or otherwise support a means for performing a read operation to read data from a preconfigured buffer address of the one or more data buffers during the time interval that the one or more processing components are in the inactive state and based at least in part on receiving the interrupt command. The write component 635 may be configured as or otherwise support a means for performing a write operation to write the data to a preconfigured memory address of the memory during the time interval that the one or more processing components are in the inactive state, wherein the one or more processing components are configured to transition from the inactive state to an active state after a completion of the write operation to process the data stored in the preconfigured memory address of the memory.

In some examples, the interrupt command is generated based at least in part on a preconfigured amount of data being stored in the one or more data buffers of the one or more sensors. In some examples, the one or more hardware components are configured to perform the read operation to read the preconfigured amount of data.

In some examples, the read component 630 may be configured as or otherwise support a means for performing an additional read operation to read a data length value from an additional preconfigured buffer address of the one or more data buffers based at least in part on receiving the interrupt command, wherein the read operation is performed to read an amount of data corresponding to the data length value from the preconfigured buffer address based at least in part on the additional read operation.

In some examples, the write component 635 may be configured as or otherwise support a means for performing an additional write operation to write the data length value to an additional preconfigured memory address of the memory, wherein the read operation is performed based at least in part on writing the data length value to the additional preconfigured memory address of the memory.

In some examples, the read component 630 may be configured as or otherwise support a means for performing an additional read operation to read a status indication associated with the data from an additional preconfigured buffer address of the one or more data buffers based at least in part on receiving the interrupt command. In some examples, the write component 635 may be configured as or otherwise support a means for performing an additional write operation to write the status indication to an additional preconfigured memory address of the memory, wherein the one or more processing components are configured to process the data based at least in part on the status indication stored in the additional preconfigured memory address.

In some examples, the write component 635 may be configured as or otherwise support a means for performing the write operation to write a first portion of the data to the preconfigured memory address of the memory during the time interval. In some examples, the write component 635 may be configured as or otherwise support a means for performing the write operation to write a second portion of the data to a second preconfigured memory address of the memory during the time interval.

In some examples, the command component 625 may be configured as or otherwise support a means for transmitting a second interrupt command to cause the one or more processing components to transition from the inactive state to the active state based at least in part on writing a preconfigured amount of data to the preconfigured memory address, based at least in part on writing an entirety of the data stored in the one or more data buffers to the memory, or both.

In some examples, the data component 645 may be configured as or otherwise support a means for identifying that an amount of data stored in the one or more data buffers satisfies one or more trigger conditions. In some examples, the command component 625 may be configured as or otherwise support a means for transmitting the interrupt command to the one or more hardware components based at least in part on the satisfaction of the one or more trigger conditions.

In some examples, the one or more trigger conditions are satisfied based at least in part on the amount of data being greater than or equal to a predefined data amount.

In some examples, the one or more trigger conditions are based at least in part on a type of the one or more sensors, a type of physiological data stored in the one or more data buffers, an operational state of the wearable device, or any combination thereof.

In some examples, the data component 645 may be configured as or otherwise support a means for processing the data stored in the preconfigured memory address of the memory based at least in part on transitioning from the inactive state to the active state. In some examples, the data component 645 may be configured as or otherwise support a means for transmitting one or more signals to the one or more sensors based at least in part on processing the data, wherein the one or more signals comprise an instruction for the one or more sensors to adjust one or more measurement parameters used by the one or more sensors to acquire the physiological data.

In some examples, the one or more hardware components comprise one or more I/O peripheral ports.

In some examples, the one or more sensors comprise a PPG sensor, a temperature sensor, a movement sensor, an electrode, or any combination thereof.

In some examples, the wearable device comprises a wearable ring device or a wrist-worn wearable device.

The data component 645 may be configured as or otherwise support a means for acquiring physiological data from a user via one or more sensors of the wearable device. The storage component 650 may be configured as or otherwise support a means for storing the physiological data within one or more data buffers of the one or more sensors. In some examples, the command component 625 may be configured as or otherwise support a means for communicating, via one or more buses, an interrupt command from the one or more sensors to one or more hardware components of an MCU of the wearable device, wherein the interrupt command is communicated via the one or more buses during a time interval that one or more processing components of the MCU are in an inactive state. In some examples, the read component 630 may be configured as or otherwise support a means for performing a read operation using the one or more hardware components to read the physiological data from a preconfigured buffer address of one or more data buffers during the time interval that the one or more processing components are in the inactive state and based at least in part on the interrupt command. In some examples, the write component 635 may be configured as or otherwise support a means for performing a write operation using the one or more hardware components to write the physiological data to a preconfigured memory address of a memory of the wearable device during the time interval that the one or more processing components are in the inactive state. The activation component 655 may be configured as or otherwise support a means for activating the one or more processing components of the MCU from the inactive state to an active state based at least in part on a completion of the write operation. The processing component 660 may be configured as or otherwise support a means for processing the physiological data stored in the preconfigured memory address of the memory using the one or more processing components based at least in part on activating the one or more processing components to the active state.

Figure 7:
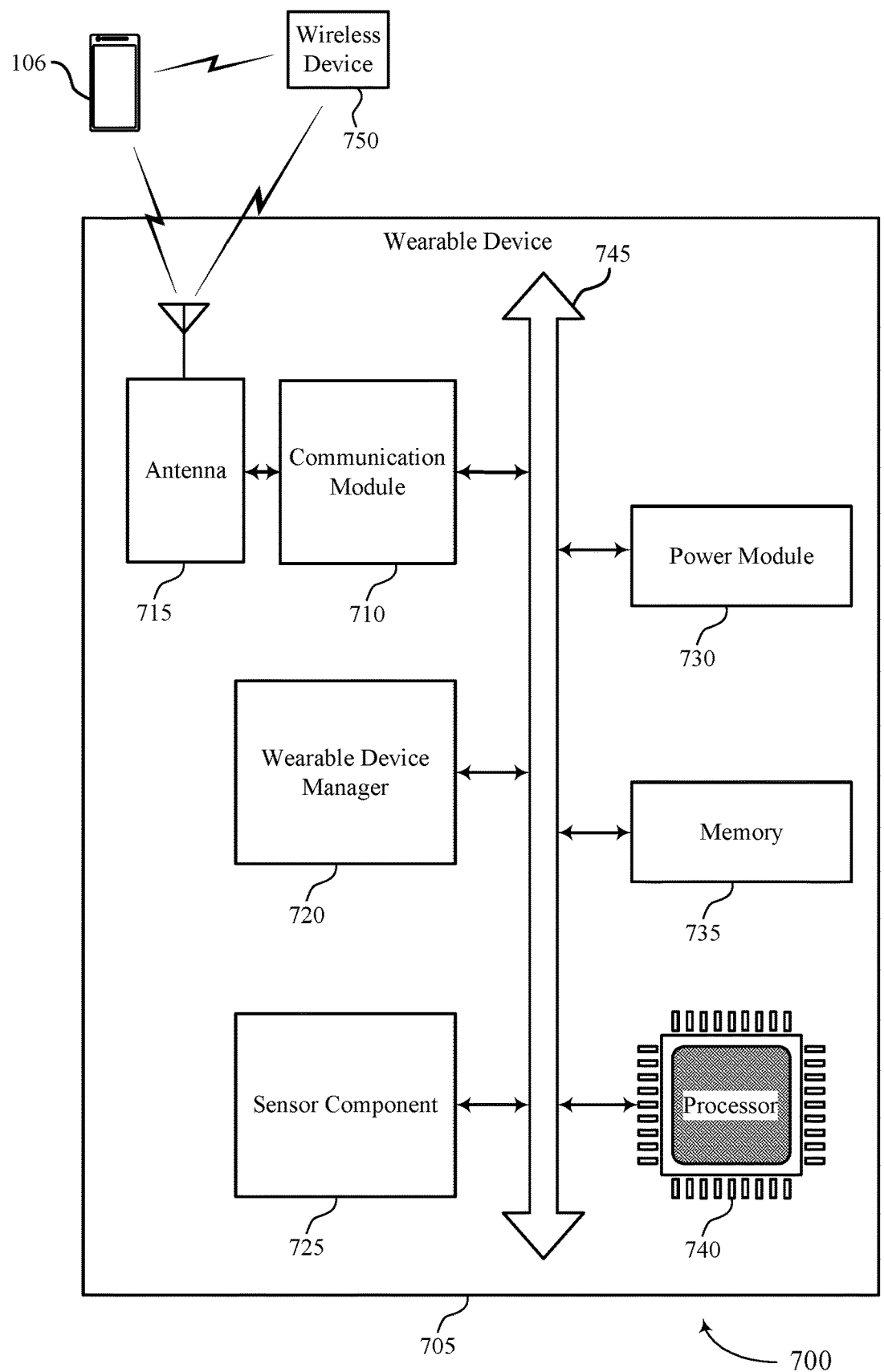
FIG. 7 shows a diagram of a system including a device that supports techniques for automated serial device integration to a microcontroller in accordance with aspects of the present disclosure.

FIG. 7 shows a diagram of a system 700 including a device 705 that supports techniques for automated serial device integration to a microcontroller in accordance with aspects of the present disclosure. The device 705 may be an example of or include components of a device 505 as described herein. The device 705 may include an example of a wearable device 104, as described previously herein. The device 705 may include components for bi-directional communications including components for transmitting and receiving communications with a user device 106 and a server 110, such as a wearable device manager 720, a communication module 710, one or more antennas 715, a sensor component 725, a power module 730, at least one memory 735, at least one processor 740, and a wireless device 750. These components may be in electronic communication or otherwise coupled (e.g., operatively, communicatively, functionally, electronically, electrically) via one or more buses (e.g., a bus 745).

For example, the wearable device manager 720 may be configured as or otherwise support a means for receiving an interrupt command from the one or more sensors via the one or more buses during a time interval that the one or more processing components are in an inactive state. The wearable device manager 720 may be configured as or otherwise support a means for performing a read operation to read data from a preconfigured buffer address of the one or more data buffers during the time interval that the one or more processing components are in the inactive state and based at least in part on receiving the interrupt command. The wearable device manager 720 may be configured as or otherwise support a means for performing a write operation to write the data to a preconfigured memory address of the memory during the time interval that the one or more processing components are in the inactive state, wherein the one or more processing components are configured to transition from the inactive state to an active state after a completion of the write operation to process the data stored in the preconfigured memory address of the memory.

In some examples, the wearable device manager 720 may be configured as or otherwise support a means for acquiring physiological data from a user via one or more sensors of the wearable device. The wearable device manager 720 may be configured as or otherwise support a means for storing the physiological data within one or more data buffers of the one or more sensors. The wearable device manager 720 may be configured as or otherwise support a means for communicating, via one or more buses, an interrupt command from the one or more sensors to one or more hardware components of an MCU of the wearable device, wherein the interrupt command is communicated via the one or more buses during a time interval that one or more processing components of the MCU are in an inactive state. The wearable device manager 720 may be configured as or otherwise support a means for performing a read operation using the one or more hardware components to read the physiological data from a preconfigured buffer address of one or more data buffers during the time interval that the one or more processing components are in the inactive state and based at least in part on the interrupt command. The wearable device manager 720 may be configured as or otherwise support a means for performing a write operation using the one or more hardware components to write the physiological data to a preconfigured memory address of a memory of the wearable device during the time interval that the one or more processing components are in the inactive state. The wearable device manager 720 may be configured as or otherwise support a means for activating the one or more processing components of the MCU from the inactive state to an active state based at least in part on a completion of the write operation. The wearable device manager 720 may be configured as or otherwise support a means for processing the physiological data stored in the preconfigured memory address of the memory using the one or more processing components based at least in part on activating the one or more processing components to the active state.

Figure 8:
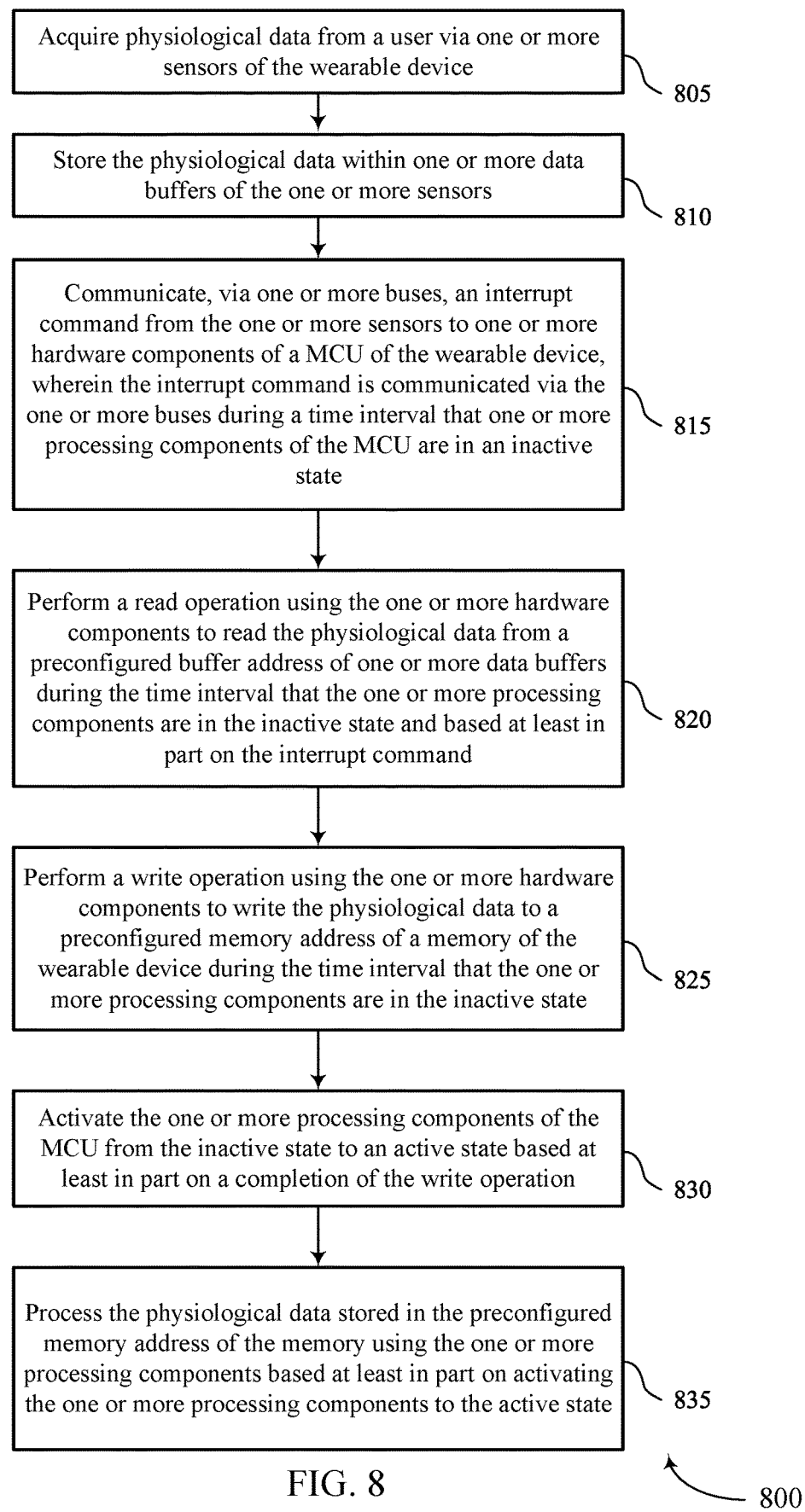
FIG. 8 shows a flowchart illustrating methods that support techniques for automated serial device integration to a microcontroller in accordance with aspects of the present disclosure.

FIG. 8 shows a flowchart illustrating a method 800 that supports techniques for automated serial device integration to a microcontroller in accordance with aspects of the present disclosure. The operations of the method 800 may be implemented by a wearable device or its components as described herein. For example, the operations of the method 800 may be performed by a wearable device as described with reference to FIGS. 1 through 7. In some examples, a wearable device may execute a set of instructions to control the functional elements of the wearable device to perform the described functions. Additionally, or alternatively, the wearable device may perform aspects of the described functions using special-purpose hardware.

At 805, the method may include acquiring physiological data from a user via one or more sensors of the wearable device. The operations of 805 may be performed in accordance with examples as disclosed herein. In some examples, aspects of the operations of 805 may be performed by a data component 645 as described with reference to FIG. 6.

At 810, the method may include storing the physiological data within one or more data buffers of the one or more sensors. The operations of 810 may be performed in accordance with examples as disclosed herein. In some examples, aspects of the operations of 810 may be performed by a storage component 650 as described with reference to FIG. 6.

At 815, the method may include communicating, via one or more buses, an interrupt command from the one or more sensors to one or more hardware components of an MCU of the wearable device, wherein the interrupt command is communicated via the one or more buses during a time interval that one or more processing components of the MCU are in an inactive state. The operations of 815 may be performed in accordance with examples as disclosed herein. In some examples, aspects of the operations of 815 may be performed by a command component 625 as described with reference to FIG. 6.

At 820, the method may include performing a read operation using the one or more hardware components to read the physiological data from a preconfigured buffer address of one or more data buffers during the time interval that the one or more processing components are in the inactive state and based at least in part on the interrupt command. The operations of 820 may be performed in accordance with examples as disclosed herein. In some examples, aspects of the operations of 820 may be performed by a read component 630 as described with reference to FIG. 6.

At 825, the method may include performing a write operation using the one or more hardware components to write the physiological data to a preconfigured memory address of a memory of the wearable device during the time interval that the one or more processing components are in the inactive state. The operations of 825 may be performed in accordance with examples as disclosed herein. In some examples, aspects of the operations of 825 may be performed by a write component 635 as described with reference to FIG. 6.

At 830, the method may include activating the one or more processing components of the MCU from the inactive state to an active state based at least in part on a completion of the write operation. The operations of 830 may be performed in accordance with examples as disclosed herein. In some examples, aspects of the operations of 830 may be performed by an activation component 655 as described with reference to FIG. 6.

At 835, the method may include processing the physiological data stored in the preconfigured memory address of the memory using the one or more processing components based at least in part on activating the one or more processing components to the active state. The operations of 835 may be performed in accordance with examples as disclosed herein. In some examples, aspects of the operations of 835 may be performed by a processing component 660 as described with reference to FIG. 6.

It should be noted that the methods described above describe possible implementations, and that the operations and the steps may be rearranged or otherwise modified and that other implementations are possible. Furthermore, aspects from two or more of the methods may be combined.

An apparatus (e.g., wearable device) is described. The apparatus may include one or more sensors configured to acquire physiological data from a user, the one or more sensors comprising one or more data buffers for storing physiological data collected by the one or more sensors, a battery configured to power the one or more sensors, a memory, and an MCU comprising one or more processing components and one or more hardware components, the one or more hardware components coupled with the one or more sensors via one or more buses, wherein the one or more hardware components are configured to receive an interrupt command from the one or more sensors via the one or more buses during a time interval that the one or more processing components are in an inactive state, perform a read operation to read data from a preconfigured buffer address of the one or more data buffers during the time interval that the one or more processing components are in the inactive state and based at least in part on receiving the interrupt command, and perform a write operation to write the data to a preconfigured memory address of the memory during the time interval that the one or more processing components are in the inactive state, wherein the one or more processing components are configured to transition from the inactive state to an active state after a completion of the write operation to process the data stored in the preconfigured memory address of the memory.

In some examples of the apparatus described herein, the interrupt command may be generated based at least in part on a preconfigured amount of data being stored in the one or more data buffers of the one or more sensors and the one or more hardware components may be configured to perform the read operation to read the preconfigured amount of data.

The apparatus described herein may further include operations, features, means, or instructions for performing an additional read operation to read a data length value from an additional preconfigured buffer address of the one or more data buffers based at least in part on receiving the interrupt command, wherein the read operation may be performed to read an amount of data corresponding to the data length value from the preconfigured buffer address based at least in part on the additional read operation.

The apparatus described herein may further include operations, features, means, or instructions for performing an additional write operation to write the data length value to an additional preconfigured memory address of the memory, wherein the read operation may be performed based at least in part on writing the data length value to the additional preconfigured memory address of the memory.

The apparatus described herein may further include operations, features, means, or instructions for performing an additional read operation to read a status indication associated with the data from an additional preconfigured buffer address of the one or more data buffers based at least in part on receiving the interrupt command and performing an additional write operation to write the status indication to an additional preconfigured memory address of the memory, wherein the one or more processing components may be configured to process the data based at least in part on the status indication stored in the additional preconfigured memory address.

The apparatus described herein may further include operations, features, means, or instructions for performing the write operation to write a first portion of the data to the preconfigured memory address of the memory during the time interval and performing the write operation to write a second portion of the data to a second preconfigured memory address of the memory during the time interval.

The apparatus described herein may further include operations, features, means, or instructions for transmitting a second interrupt command to cause the one or more processing components to transition from the inactive state to the active state based at least in part on writing a preconfigured amount of data to the preconfigured memory address, based at least in part on writing an entirety of the data stored in the one or more data buffers to the memory, or both.

The apparatus described herein may further include operations, features, means, or instructions for identifying that an amount of data stored in the one or more data buffers satisfies one or more trigger conditions and transmitting the interrupt command to the one or more hardware components based at least in part on the satisfaction of the one or more trigger conditions.

In some examples of the apparatus described herein, the one or more trigger conditions may be satisfied based at least in part on the amount of data being greater than or equal to a predefined data amount.

In some examples of the apparatus described herein, the one or more trigger conditions may be based at least in part on a type of the one or more sensors, a type of physiological data stored in the one or more data buffers, an operational state of the wearable device, or any combination thereof.

The apparatus described herein may further include operations, features, means, or instructions for processing the data stored in the preconfigured memory address of the memory based at least in part on transitioning from the inactive state to the active state and transmitting one or more signals to the one or more sensors based at least in part on processing the data, wherein the one or more signals comprise an instruction for the one or more sensors to adjust one or more measurement parameters used by the one or more sensors to acquire the physiological data.

In some examples of the apparatus described herein, the one or more hardware components comprise one or more I/O peripheral ports.

In some examples of the apparatus described herein, the one or more sensors comprise a PPG sensor, a temperature sensor, a movement sensor, an electrode, or any combination thereof.

In some examples of the apparatus described herein, the wearable device comprises a wearable ring device or a wrist-worn wearable device.

An apparatus (e.g., MCU) is described. The apparatus may include one or more processing components configured to process physiological data acquired from a user via one or more sensors of the wearable device and one or more hardware components communicatively coupling with the one or more processing components and the one or more sensors, wherein the one or more hardware components are configured to receive an interrupt command from the one or more sensors via one or more buses during a time interval that the one or more processing components are in an inactive state, perform a read operation to read data from a preconfigured buffer address of one or more data buffers associated with the one or more sensors during the time interval that the one or more processing components are in the inactive state and based at least in part on receiving the interrupt command, and perform a write operation to write the data to a preconfigured memory address of a memory of the wearable device during the time interval that the one or more processing components are in the inactive state, wherein the one or more processing components are configured to transition from the inactive state to an active state after a completion of the write operation to process the data stored in the preconfigured memory address of the memory.

In some examples of the apparatus described herein, the interrupt command may be generated based at least in part on a preconfigured amount of data being stored in the one or more data buffers of the one or more sensors and the one or more hardware components may be configured to perform the read operation to read the preconfigured amount of data.

Some examples of the apparatus described herein may further include operations, features, means, or instructions for performing an additional read operation to read a data length value from an additional preconfigured buffer address of the one or more data buffers based at least in part on receiving the interrupt command, wherein the read operation may be performed to read an amount of data corresponding to the data length value from the preconfigured buffer address based at least in part on the additional read operation.

Some examples of the apparatus described herein may further include operations, features, means, or instructions for performing an additional write operation to write the data length value to an additional preconfigured memory address of the memory, wherein the read operation may be performed based at least in part on writing the data length value to the additional preconfigured memory address of the memory.

Some examples of the apparatus described herein may further include operations, features, means, or instructions for performing an additional read operation to read a status indication associated with the data from an additional preconfigured buffer address of the one or more data buffers based at least in part on receiving the interrupt command and performing an additional write operation to write the status indication to an additional preconfigured memory address of the memory, wherein the one or more processing components may be configured to process the data based at least in part on the status indication stored in the additional preconfigured memory address.

A method is described. The method may include acquiring physiological data from a user via one or more sensors of the wearable device, storing the physiological data within one or more data buffers of the one or more sensors, communicating, via one or more buses, an interrupt command from the one or more sensors to one or more hardware components of an MCU of the wearable device, wherein the interrupt command is communicated via the one or more buses during a time interval that one or more processing components of the MCU are in an inactive state, performing a read operation using the one or more hardware components to read the physiological data from a preconfigured buffer address of one or more data buffers during the time interval that the one or more processing components are in the inactive state and based at least in part on the interrupt command, performing a write operation using the one or more hardware components to write the physiological data to a preconfigured memory address of a memory of the wearable device during the time interval that the one or more processing components are in the inactive state, activating the one or more processing components of the MCU from the inactive state to an active state based at least in part on a completion of the write operation, and processing the physiological data stored in the preconfigured memory address of the memory using the one or more processing components based at least in part on activating the one or more processing components to the active state.

An apparatus is described. The apparatus may include one or more memories storing processor executable code, and one or more processors coupled with the one or more memories. The one or more processors may individually or collectively be operable to execute the code to cause the apparatus to acquire physiological data from a user via one or more sensors of the wearable device, store the physiological data within one or more data buffers of the one or more sensors, communicate, via one or more buses, an interrupt command from the one or more sensors to one or more hardware components of an MCU of the wearable device, wherein the interrupt command is communicated via the one or more buses during a time interval that one or more processing components of the MCU are in an inactive state, perform a read operation using the one or more hardware components to read the physiological data from a preconfigured buffer address of one or more data buffers during the time interval that the one or more processing components are in the inactive state and based at least in part on the interrupt command, perform a write operation using the one or more hardware components to write the physiological data to a preconfigured memory address of a memory of the wearable device during the time interval that the one or more processing components are in the inactive state, activate the one or more processing components of the MCU from the inactive state to an active state based at least in part on a completion of the write operation, and process the physiological data stored in the preconfigured memory address of the memory using the one or more processing components based at least in part on activating the one or more processing components to the active state.

Another apparatus is described. The apparatus may include means for acquiring physiological data from a user via one or more sensors of the wearable device, means for storing the physiological data within one or more data buffers of the one or more sensors, means for communicating, via one or more buses, an interrupt command from the one or more sensors to one or more hardware components of an MCU of the wearable device, wherein the interrupt command is communicated via the one or more buses during a time interval that one or more processing components of the MCU are in an inactive state, means for performing a read operation using the one or more hardware components to read the physiological data from a preconfigured buffer address of one or more data buffers during the time interval that the one or more processing components are in the inactive state and based at least in part on the interrupt command, means for performing a write operation using the one or more hardware components to write the physiological data to a preconfigured memory address of a memory of the wearable device during the time interval that the one or more processing components are in the inactive state, means for activating the one or more processing components of the MCU from the inactive state to an active state based at least in part on a completion of the write operation, and means for processing the physiological data stored in the preconfigured memory address of the memory using the one or more processing components based at least in part on activating the one or more processing components to the active state.

A non-transitory computer-readable medium storing code is described. The code may include instructions executable by one or more processors to acquire physiological data from a user via one or more sensors of the wearable device, store the physiological data within one or more data buffers of the one or more sensors, communicate, via one or more buses, an interrupt command from the one or more sensors to one or more hardware components of an MCU of the wearable device, wherein the interrupt command is communicated via the one or more buses during a time interval that one or more processing components of the MCU are in an inactive state, perform a read operation using the one or more hardware components to read the physiological data from a preconfigured buffer address of one or more data buffers during the time interval that the one or more processing components are in the inactive state and based at least in part on the interrupt command, perform a write operation using the one or more hardware components to write the physiological data to a preconfigured memory address of a memory of the wearable device during the time interval that the one or more processing components are in the inactive state, activate the one or more processing components of the MCU from the inactive state to an active state based at least in part on a completion of the write operation, and process the physiological data stored in the preconfigured memory address of the memory using the one or more processing components based at least in part on activating the one or more processing components to the active state.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A wearable device, comprising:
one or more sensors configured to acquire physiological data from a user, the one or more sensors comprising one or more data buffers for storing physiological data collected by the one or more sensors;
a battery configured to power the one or more sensors;
a memory; and
a microcontroller unit (MCU) comprising one or more processing components and one or more hardware components, the one or more hardware components coupled with the one or more sensors via one or more buses, wherein the one or more hardware components are configured to:
receive an interrupt command from the one or more sensors via the one or more buses during a time interval that the one or more processing components are in an inactive state;
perform a read operation to read data from a preconfigured buffer address of the one or more data buffers during the time interval that the one or more processing components are in the inactive state and based at least in part on receiving the interrupt command; and perform a write operation to write the data to a preconfigured memory address of the memory during the time interval that the one or more processing components are in the inactive state, wherein the one or more processing components are configured to transition from the inactive state to an active state after a completion of the write operation to process the data stored in the preconfigured memory address of the memory.

2. The wearable device of claim 1, wherein the interrupt command is generated based at least in part on a preconfigured amount of data being stored in the one or more data buffers of the one or more sensors, wherein the one or more hardware components are configured to perform the read operation to read the preconfigured amount of data.

3. The wearable device of claim 1, wherein the one or more hardware components are further configured to:

perform an additional read operation to read a data length value from an additional preconfigured buffer address of the one or more data buffers based at least in part on receiving the interrupt command, wherein the read operation is performed to read an amount of data corresponding to the data length value from the preconfigured buffer address based at least in part on the additional read operation.

4. The wearable device of claim 3, wherein the one or more hardware components are further configured to:

perform an additional write operation to write the data length value to an additional preconfigured memory address of the memory, wherein the read operation is performed based at least in part on writing the data length value to the additional preconfigured memory address of the memory.

5. The wearable device of claim 1, wherein the one or more hardware components are further configured to:

perform an additional read operation to read a status indication associated with the data from an additional preconfigured buffer address of the one or more data buffers based at least in part on receiving the interrupt command; and perform an additional write operation to write the status indication to an additional preconfigured memory address of the memory, wherein the one or more processing components are configured to process the data based at least in part on the status indication stored in the additional preconfigured memory address.

6. The wearable device of claim 1, wherein, to perform the write operation, the one or more hardware components are configured to:

perform the write operation to write a first portion of the data to the preconfigured memory address of the memory during the time interval; and perform the write operation to write a second portion of the data to a second preconfigured memory address of the memory during the time interval.

7. The wearable device of claim 1, the one or more hardware components are configured to:

transmit a second interrupt command to cause the one or more processing components to transition from the inactive state to the active state based at least in part on writing a preconfigured amount of data to the preconfigured memory address, based at least in part on writing an entirety of the data stored in the one or more data buffers to the memory, or both.

8. The wearable device of claim 1, wherein the one or more sensors are configured to:

identify that an amount of data stored in the one or more data buffers satisfies one or more trigger conditions; and transmit the interrupt command to the one or more hardware components based at least in part on the satisfaction of the one or more trigger conditions.

9. The wearable device of claim 8, wherein the one or more trigger conditions are satisfied based at least in part on the amount of data being greater than or equal to a predefined data amount.

10. The wearable device of claim 8, wherein the one or more trigger conditions are based at least in part on a type of the one or more sensors, a type of physiological data stored in the one or more data buffers, an operational state of the wearable device, or any combination thereof.

11. The wearable device of claim 1, wherein the one or more processing components of the MCU are configured to:

process the data stored in the preconfigured memory address of the memory based at least in part on transitioning from the inactive state to the active state; and transmit one or more signals to the one or more sensors based at least in part on processing the data, wherein the one or more signals comprise an instruction for the one or more sensors to adjust one or more measurement parameters used by the one or more sensors to acquire the physiological data.

12. The wearable device of claim 1, the one or more hardware components comprise one or more input/output (I/O) peripheral ports.

13. The wearable device of claim 1, wherein the one or more sensors comprise a photoplethysmogram (PPG) sensor, a temperature sensor, a movement sensor, an electrode, or any combination thereof.

14. The wearable device of claim 1, wherein the wearable device comprises a wearable ring device or a wrist-worn wearable device.

15. A microcontroller unit (MCU) of a wearable device, comprising:

one or more processing components configured to process physiological data acquired from a user via one or more sensors of the wearable device; and one or more hardware components communicatively coupled with the one or more processing components and the one or more sensors, wherein the one or more hardware components are configured to:

receive an interrupt command from the one or more sensors via one or more buses during a time interval that the one or more processing components are in an inactive state;

perform a read operation to read data from a preconfigured buffer address of one or more data buffers associated with the one or more sensors during the time interval that the one or more processing components are in the inactive state and based at least in part on receiving the interrupt command; and perform a write operation to write the data to a preconfigured memory address of a memory of the wearable device during the time interval that the one or more processing components are in the inactive state, wherein the one or more processing components are configured to transition from the inactive state to an active state after a completion of the write operation to process the data stored in the preconfigured memory address of the memory.

16. The MCU of claim 15, wherein the interrupt command is generated based at least in part on a preconfigured amount of data being stored in the one or more data buffers of the one or more sensors, wherein the one or more hardware components are configured to perform the read operation to read the preconfigured amount of data.

17. The MCU of claim 15, wherein the one or more hardware components are further configured to:
perform an additional read operation to read a data length value from an additional preconfigured buffer address of the one or more data buffers based at least in part on receiving the interrupt command, wherein the read operation is performed to read an amount of data corresponding to the data length value from the preconfigured buffer address based at least in part on the additional read operation.

18. The MCU of claim 17, wherein the one or more hardware components are further configured to:
perform an additional write operation to write the data length value to an additional preconfigured memory address of the memory, wherein the read operation is performed based at least in part on writing the data length value to the additional preconfigured memory address of the memory.

19. The MCU of claim 15, wherein the one or more hardware components are further configured to:
perform an additional read operation to read a status indication associated with the data from an additional preconfigured buffer address of the one or more data buffers based at least in part on receiving the interrupt command; and
perform an additional write operation to write the status indication to an additional preconfigured memory address of the memory, wherein the one or more processing components are configured to process the data based at least in part on the status indication stored in the additional preconfigured memory address.

20. A method implemented a wearable device, comprising:
acquiring physiological data from a user via one or more sensors of the wearable device;
storing the physiological data within one or more data buffers of the one or more sensors;
communicating, via one or more buses, an interrupt command from the one or more sensors to one or more hardware components of a microcontroller unit (MCU) of the wearable device, wherein the interrupt command is communicated via the one or more buses during a time interval that one or more processing components of the MCU are in an inactive state;
performing a read operation using the one or more hardware components to read the physiological data from a preconfigured buffer address of one or more data buffers during the time interval that the one or more processing components are in the inactive state and based at least in part on the interrupt command;
performing a write operation using the one or more hardware components to write the physiological data to a preconfigured memory address of a memory of the wearable device during the time interval that the one or more processing components are in the inactive state;
activating the one or more processing components of the MCU from the inactive state to an active state based at least in part on a completion of the write operation; and
processing the physiological data stored in the preconfigured memory address of the memory using the one or more processing components based at least in part on activating the one or more processing components to the active state.

* * * * *